US012640809B2

(12) United States Patent
Becker et al.

(10) Patent No.: US 12,640,809 B2
(45) Date of Patent: May 26, 2026

(54) EXTENDED BEAMFORMING FOR SATELLITE COMMUNICATION

(71) Applicant: Hughes Network Systems, LLC, Germantown, MD (US)

(72) Inventors: Neal David Becker, Olney, MD (US); Udaya Bhaskar, North Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 405 days.

(21) Appl. No.: 18/496,601

(22) Filed: Oct. 27, 2023

(65) Prior Publication Data

US 2025/0141538 A1 May 1, 2025

(51) Int. Cl.
$\;\;\;$ H04B 7/185 (2006.01)
$\;\;\;$ H04B 7/06 (2006.01)
$\;\;\;$ H04B 7/195 (2006.01)

(52) U.S. Cl.
$\;\;\;$ CPC ....... H04B 7/18532 (2013.01); H04B 7/0617 (2013.01); H04B 7/195 (2013.01)

(58) Field of Classification Search
$\;\;\;$ CPC .. H04B 7/18532; H04B 7/0617; H04B 7/195; H04B 7/18515; H04B 7/2041
$\;\;\;$ See application file for complete search history.

(56) References Cited

U.S. PATENT DOCUMENTS

| | | | |
|---|---|---|---|
| 6,061,023 A | 5/2000 | Daniel et al. | |
| 9,608,716 B1 * | 3/2017 | Elwailly | H04B 7/18519 |
| 9,825,693 B1 | 11/2017 | Siegrist et al. | |
| 2007/0232227 A1 | 10/2007 | Draganov et al. | |
| 2017/0149144 A1 * | 5/2017 | Gallagher | H01Q 1/38 |
| 2019/0207676 A1 * | 7/2019 | Noerpel | H04B 7/2041 |
| 2021/0376915 A1 * | 12/2021 | Mahalingam | H04B 7/18513 |

OTHER PUBLICATIONS

International Search Report and Written Opinion issued Feb. 6, 2025 in PCT/US2024/052902 (9 pages).

* cited by examiner

*Primary Examiner* — Tejis Daya
(74) *Attorney, Agent, or Firm* — NovoTechIP International PLLC

(57) ABSTRACT

In beamforming with an antenna for satellite communications, the antenna includes an array of radiating elements. The beamforming method includes: formulating a matrix based on responses from all elements of the antenna to each of a number of users of a first satellite; augmenting the matrix by adding responses from the elements of the antenna to other users served by a different satellite; from the augmented matrix, generating a beamforming matrix; and with the beamforming matrix, beamforming a beam from the antenna.

20 Claims, 6 Drawing Sheets

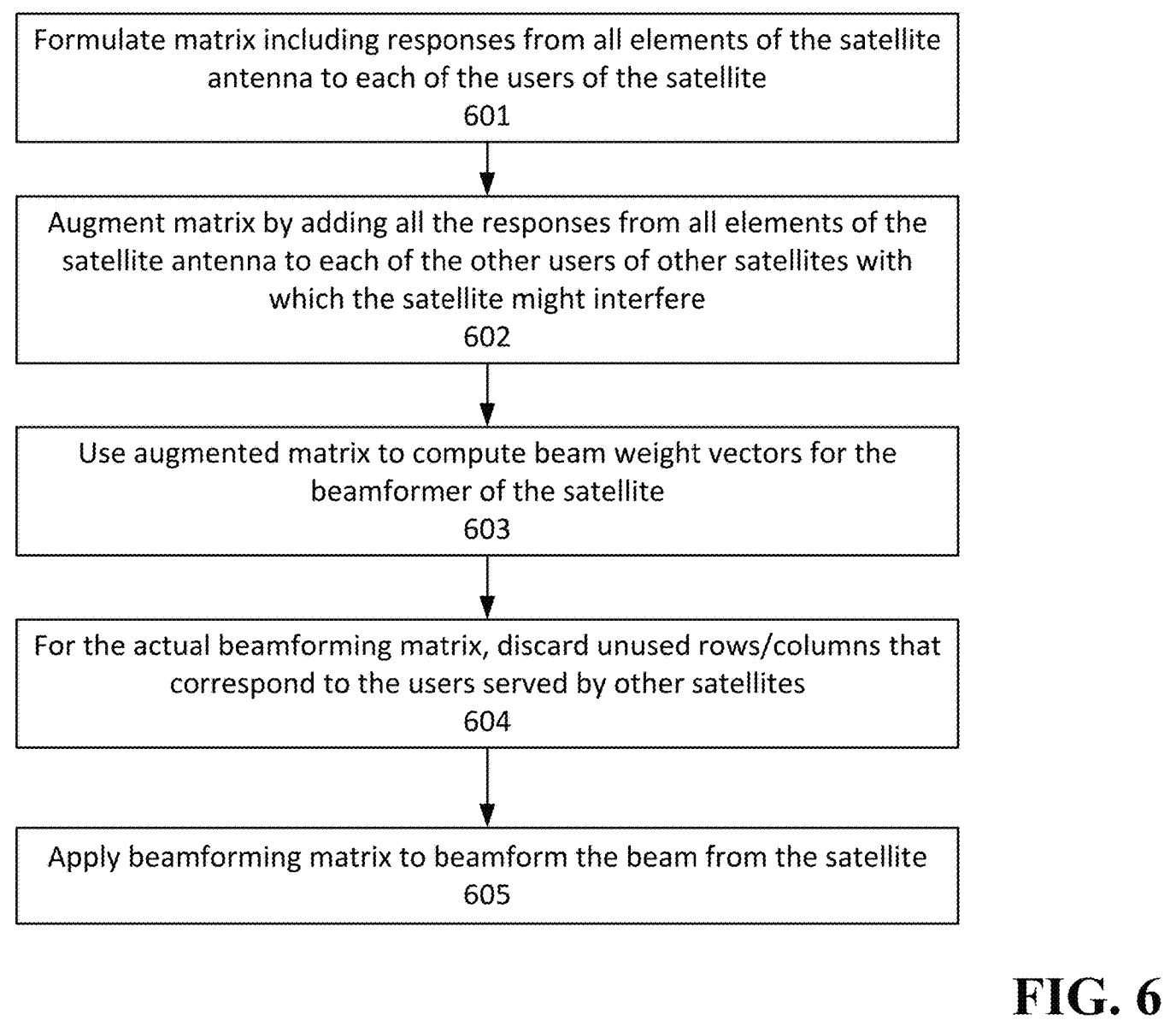

Formulate matrix including responses from all elements of the satellite antenna to each of the users of the satellite
601

Augment matrix by adding all the responses from all elements of the satellite antenna to each of the other users of other satellites with which the satellite might interfere
602

Use augmented matrix to compute beam weight vectors for the beamformer of the satellite
603

For the actual beamforming matrix, discard unused rows/columns that correspond to the users served by other satellites
604

Apply beamforming matrix to beamform the beam from the satellite
605

FIG. 6

EXTENDED BEAMFORMING FOR SATELLITE COMMUNICATION

BACKGROUND

Satellite networks have become an integral part of modern telecommunications infrastructure. These systems facilitate global connectivity, enabling services such as television broadcasting, internet access, and remote sensing, among others. To meet the increasing demands for high-speed data transmission, reliability, and efficiency, satellite communication systems have evolved significantly. For example, traditional satellite communication systems often employed omnidirectional antennas, which transmit and receive signals in all directions uniformly. While omnidirectional transmission was suitable for certain applications, it presented limitations when aiming to achieve higher data throughput, signal quality, and interference mitigation.

Beamforming is a signal processing technique that has emerged as a fundamental advancement in satellite communications. Traditional satellite antennas are not omnidirectional but rather form fixed pre-defined beam patterns using e.g., parabolic antennas. In contrast, beamforming using phased arrays so that the beam patterns can be dynamically defined and rapidly changed to meet varying requirements. Consequently, beamforming plays a pivotal role in enhancing the performance and capabilities of satellite communication systems.

Specifically, beamforming enables the focusing of transmitted signals toward intended recipients, such as ground stations or user terminals. Concentrating signal energy improves the signal-to-noise ratio and mitigates signal degradation over long-distance communication links. Also, by directing signals precisely toward targeted areas, beamforming substantially enhances data throughput capacity. Increased data throughput is important in satellite internet services, video streaming, and other data-intensive applications that demand high-speed and reliable connections. Satellite communication signals are also susceptible to interference from neighboring satellites and terrestrial sources. Beamforming allows for the selective reception and transmission of signals from specific directions, thus reducing interference and enhancing system reliability.

Beamforming technology also enables satellites to dynamically adjust their beam patterns to cover varying geographical regions and user demands. Such adaptability optimizes resource allocation and ensures efficient utilization of satellite resources. Lastly, by concentrating signal energy in desired directions, beamforming reduces the need for high-power transmissions, contributing to improved energy efficiency in satellite communication systems.

SUMMARY

In beamforming with an antenna for satellite communications, the antenna includes an array of radiating elements. The beamforming method includes: formulating a matrix based on responses from all elements of the antenna to each of a number of users of a first satellite; augmenting the matrix by adding responses from the elements of the antenna to other users served by a different satellite; from the augmented matrix, generating beam weight vectors for a beamforming matrix; and with the beamforming matrix, beamforming a beam from the antenna.

In a beamforming system for an antenna for satellite communications, the antenna includes an array of radiating elements. The system further includes: a processor programmed to receive channel vectors representing responses from all elements of the antenna to each of a number of users of a first satellite and augment a matrix formulated from the channel vectors with a number of additional channel vectors representing responses from the elements of the antenna to other users served by a different satellite the processor to generate a beam weight vectors for each channel vector by jointly maximizing a signal to noise and interference ratio (SINR); and a beamformer to generate a beamforming matrix from the beam weight vectors and use the beamforming matrix to drive the elements of the antenna to beamform a beam from the antenna.

In a method of beamforming with an antenna of a first satellite, the antenna having an array of radiating elements, the method includes beamforming a beam of the antenna by taking into account responses of the elements to users of the first satellite; and further adjusting the beamforming by taking into account responses of the elements to a set of users of a second satellite, where the users of the second satellite are in terrestrial proximity to the users of the first satellite such that interference that degrades communications can occur.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 1 also illustrates interference between Low Earth Orbit (LEO) and Medium Earth Orbit (MEO) satellites.

FIG. 2 also illustrates both intrasatellite and intrasatellite interference between satellites in different LEO constellations.

FIG. 6 illustrates a flowchart for beamforming according to the principles described herein.

DETAILED DESCRIPTION

As noted above, satellite communications and networks have seen widespread growth. Different operators launch their own separate networks of satellites, each referred to as a constellation. A constellation can occupy LEO altitudes or MEO altitudes. There are also higher satellites that are in geosynchronous orbit (GEO).

For LEO and MEO constellations that are not in geosynchronous orbit, the position of the satellites in the constellation is constantly changing as viewed from a ground station on earth. Because of the proliferation of different constellations, two non-geosynchronous satellites from different constellations may periodically move into conjunction or appear very close to each other from the perspective of a ground station on earth. Also, a non-geosynchronous satellite may move in front of, or close to being in front of, a geosynchronous satellite from the perspective of the ground station. In any of these situations, attempted communications between a terrestrial terminal and one of the satellites may experience interference from the other satellite.

Figure 1:
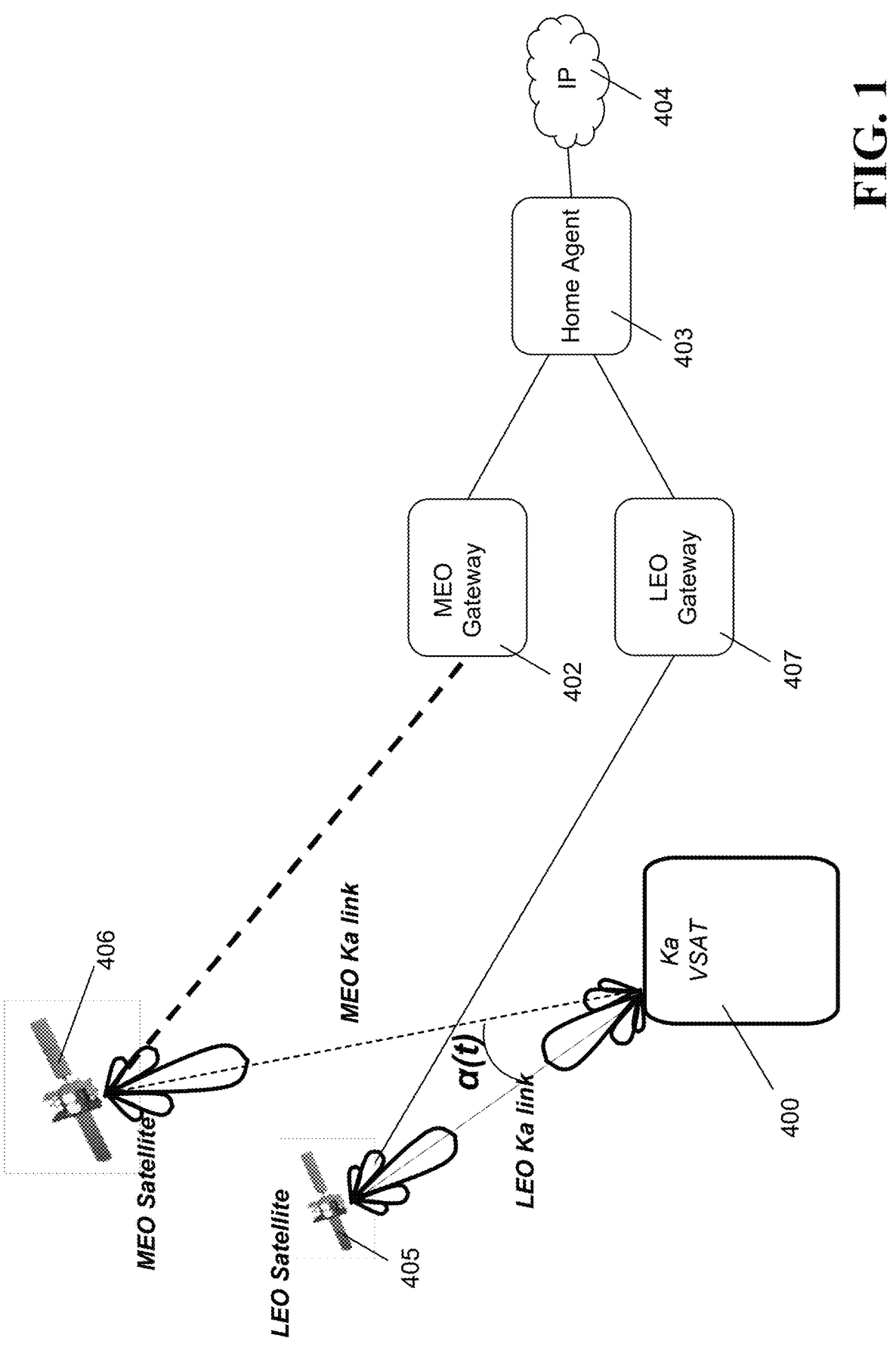
FIG. 1 illustrates an example satellite communication system in which the principles described herein can be implemented.

FIG. 1 illustrates an example satellite communication system in which the principles described herein can be implemented. In the example of FIG. 1, a user terminal 400 is in a location that has no terrestrial connection with a target or destination network, such as the Internet or another network. Consequently, communication is provided for the terminal 400 to the target network 404 by satellite, as described in further detail below. In this example, the user terminal 400 is a Very Small Aperture Terminal (VSAT). VSATs are commonly used for the transmission and reception of data, voice and video signals over a satellite communication network.

FIG. 1 also illustrates the potential for interference between LEO and MEO satellites. As seen in FIG. 1, an LEO satellite 405 provides communication between the user terminal 400 and an LEO gateway 407. Additionally in FIG. 1, there is an MEO constellation, and one of the MEO satellites 406 provides communication between the user VSAT 400 and an MEO gateway 402. Both gateways 407, 402 communicate through a home agent 403 with the destination network 404. e.g., an Internet Protocol (IP) network such as the internet.

In this example, a (t) is the separation angle between the LEO satellite 405 and MEO satellite 406 as seen by the VSAT 400. The separation angle will constantly change as a function of time as both LEO and MEO constellations are moving with respect to the VSAT 400. Below a lower threshold of the angle α(t), the VSAT 400 will experience interference between the two satellites if trying to communicate with either one.

As shown in FIG. 1, the signals from a satellite or a user terminal naturally have a shape that includes a main lobe, representing maximum signal strength, pointed in the direction of the communication. On either side of the main lobe are smaller side lobes with a direction that is at an angle to the desired direction of the signal. If there is insufficient angular separation between satellites, these sidelobes may still cause inter-constellation interference and degrade communication with the VSAT 400 as shown in FIG. 1. Consequently, suppression of these side lobes has been used as a technique in the industry to mitigate the interference.

The primary goal of sidelobe suppression is to minimize the power or energy present in these sidelobes while preserving the desired signal in the main lobe that is centered on the satellite being linked. Beamforming is one of various signal processing techniques that have been used in the industry for sidelobe suppression. In array signal processing, beamforming algorithms are employed to focus the transmitted or received signal towards the desired direction while suppressing sidelobes in other directions. Specifically, it is possible to use beamforming algorithms such as MMSE to minimize the interference falling onto specific directions where it may be harmful to other users. Adaptive beamforming techniques can dynamically adjust the array weights to enhance the main lobe and attenuate or modify sidelobes.

A steerable satellite antenna utilizes several components to achieve beamforming. First, it incorporates an array of individual radiating elements, often in the form of patch antennas or horn antennas. To control the direction of the beam, phase shifters are employed to adjust the phase of the signals sent to each radiating element. The phase manipulation leads to constructive interference in the desired direction, forming a focused beam.

Additionally, amplitude weighting elements control the strength of the signals sent to each radiating element, enabling further beam shaping. By carefully adjusting the phase and amplitude of each element's signal, the antenna can steer the beam in real-time, allowing communication with different ground stations or coverage of specific regions without physically reorienting the satellite or ground antenna. The adaptive beamforming capability enhances the satellite's flexibility and efficiency in data transmission and reception.

Figure 2:
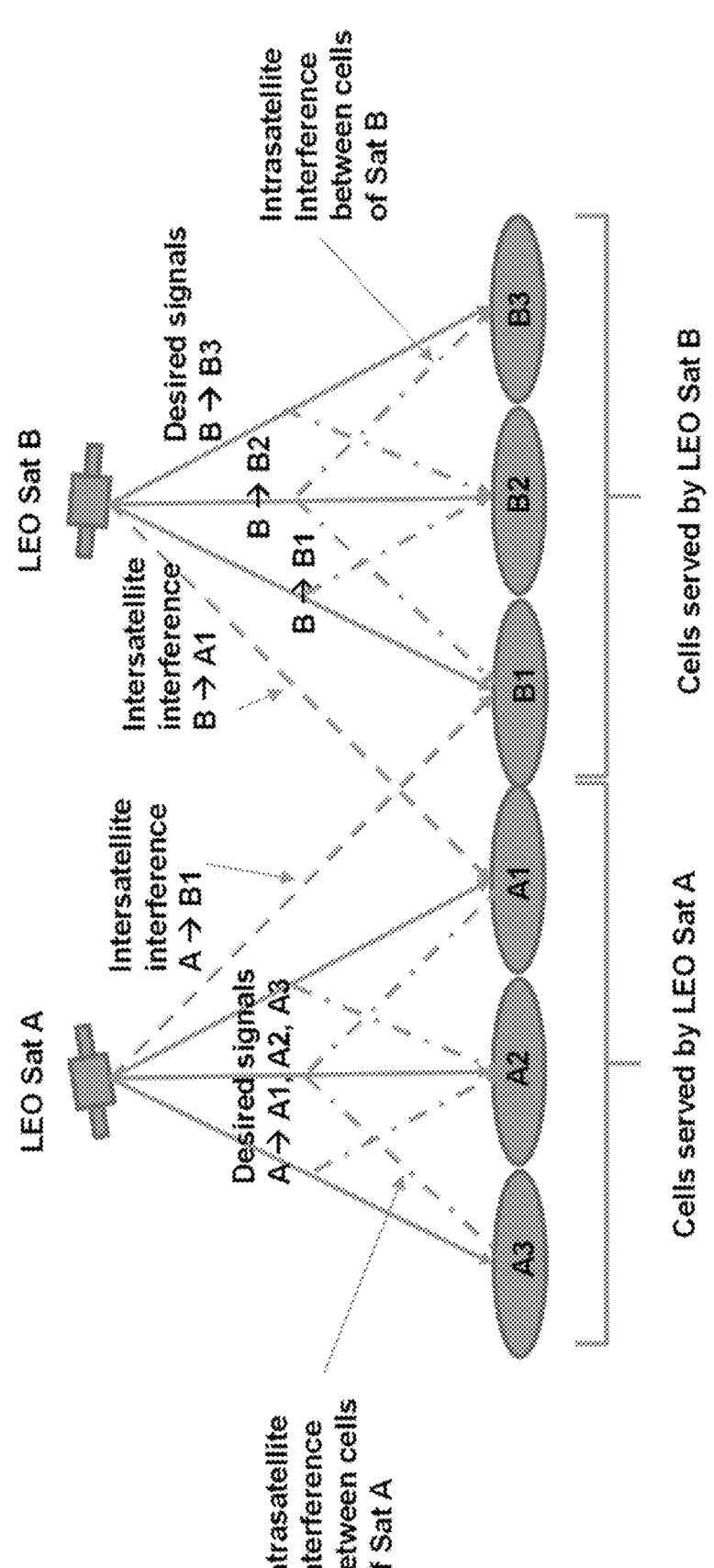
FIG. 2 illustrates another example satellite communication system in which the principles described herein can be implemented.

FIG. 2 illustrates another example of a satellite communication system in which the principles described herein can be implemented. FIG. 2 also illustrates both intrasatellite interference for a single satellite and intersatellite interference between satellites in different Low LEO constellations. As shown in FIG. 2, a first LEO satellite A is serving a number of cells on the ground, indicated as A1, A2 and A3. A cell is a geographic area served by a satellite. A cell may or may not contain a user terminal receiving communications.

The desired signals in the system are the signals from satellite A to each of the cells A1, A2 and A3. By signal steering, as described above, satellite A can direct a signal to each of the cells being served. However, as also shown in FIG. 2, there may be interference, referred to as intrasatellite interference, between the signals to and from the cells being served by satellite A. Additionally, another LEO satellite, satellite B, serves an adjacent set of cells, indicated as B1, B2 and B3. In this case, intersatellite interference may occur between the signals from satellite B to each of the cells, B1, B2 and B3.

As also shown in FIG. 2, there may be intersatellite interference between satellites A and B when any of the cells receives part of the signal from the other satellite that serves the other cell group. Specifically, as shown in FIG. 2, signals from satellite A may be received by cell B1, and signals from satellite B may be received by cell A1. The interference degrades the desired communication between a cell and its corresponding satellite. However, beamforming can be used to mitigate the interference.

Consider the forward link from the satellite to ground stations on the earth surface (a similar description will apply in the return direction). As noted above, to maximize the performance of such satellites, beamformers and beamforming techniques are often employed that involve, for example, Direct Radiating Array (DRA) antennae. Many techniques are known in the literature for optimizing the performance of such beamformers.

Mathematically, the beamforming operation can be described as a matrix multiplication. Given a vector of signals as inputs to each of multiple beams x, the vector of inputs to each of the radiating elements of the antenna array y can be described by:

$$y = Wx$$

where W is the beam weight matrix.

Figure 3:
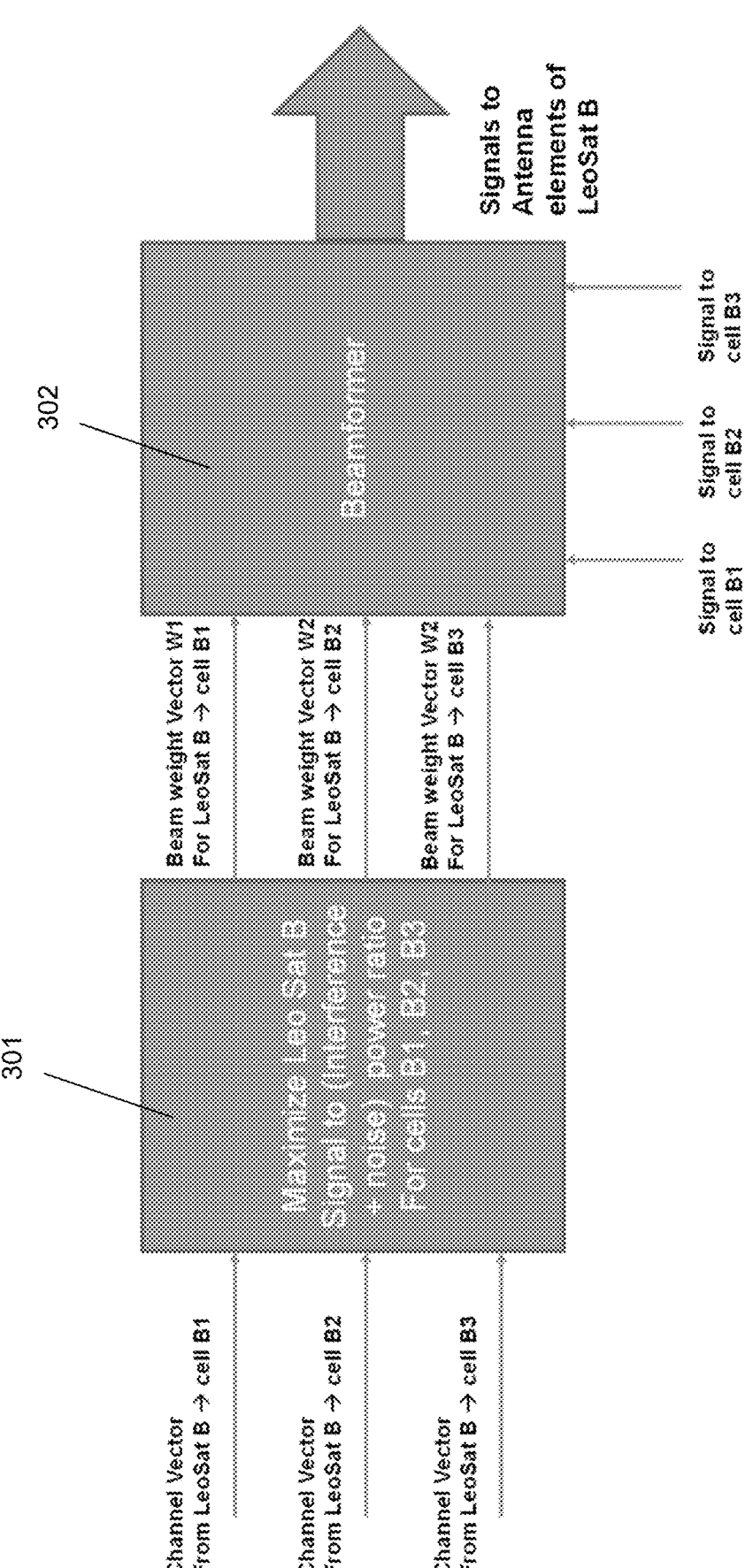
FIG. 3 illustrates an example beamforming system for satellite communication.

FIG. 3 illustrates an example of a satellite beamforming system. The illustrated system is for satellite B serving cells B1-B3, as seen in FIG. 2. As shown in FIG. 3, a processor 301 receives a channel vector between satellite B and each of the cells being served. Each vector represents the response between each radiating element of the antenna array and the corresponding cell. Using all the input channel vectors, the processor will calculate a weight for each of the vectors so as to maximize the ratio of signal power over noise and interference power (SINR). Methods for calculating these beam forming weights will be further discussed below.

The processor 301 then outputs a beam weight vector for each channel vector. The beam weight vectors are input to a beamformer 302. The beamformer 302 also receives the set of signals that includes the signal that is to be sent to each of the individual cells. The beamformer 302 uses the beam weight vector for each cell to optimally shape the signal being sent to that cell. The beamformer 302 then outputs a corresponding driver signal to the individual elements of the array of the antenna of satellite B. Thus, the beam from the antenna is formed according to the beam weight vectors under control of the beamformer 302 to mitigate interference.

There are many well-known methods to calculate the beam forming weights W. The matrix H is the channel response from each antenna element to each of the receivers on the earth. Mathematically, an optimization of the matrix W can be formulated based on the matrix H, with different optimization criteria leading to different approaches. Processor 301 performs the calculation of the beam forming weights, described above.

As an example, Minimum Mean Square Error (MMSE) beamforming is a signal processing technique that includes the use of calculated beam forming weights. The primary objective of MMSE beamforming is to minimize the mean square error (MSE) between the desired signal and the received signal while accounting for the noise and interference in the channel. MMSE beamforming is often employed in scenarios where multiple antenna elements are used at the receiver (receiving array). Each antenna receives a slightly different version of the transmitted signal due to variations in the wireless channel, and these received signals can interfere with each other. MMSE beamforming uses the spatial properties of the received signals. It takes advantage of the fact that signals arriving from different directions will experience different channel conditions, leading to differences in the received amplitudes and phases at each antenna element.

A key idea behind MMSE beamforming is to apply complex weights to each antenna's received signal. These weights are carefully chosen to maximize the signal-to-interference-plus-noise ratio (SINR) at the output, which means enhancing the desired signal while suppressing interference and noise. The complex weights are optimized to minimize the MSE between the estimated transmitted signal and the received signal. The optimization takes into account the statistical properties of the channel, noise, and interference. By intelligently adjusting the weights, MMSE beamforming can effectively cancel out or reduce the impact of interfering signals, especially when they arrive from directions different from the desired signal. MMSE beamforming can be adaptive, meaning that it can continuously adjust the weights based on the changing channel conditions. Adaptability ensures that the beamforming technique remains effective in dynamic environments.

In the current example. MMSE leads to the formulation:

$$W_{MMSE} = \left(H^H H + \lambda I\right)^{-1} H^H$$

where $(\bullet)^H$ superscript denotes Hermitian (conjugate transpose), and the choice of A depends on the optimization problem.

The following description addresses the concept of applying the MMSE technique, not to a single beamforming satellite, but to a network of LEO satellites. In one aspect, an H matrix may be used that describes the responses from all of the elements on all of the satellites to all of the users on the ground, with the result being a beamforming matrix W which describes the weights of all of the elements on all of the satellites. Given the number of satellites in orbit and the possible number of ground stations, such a matrix would be prohibitively large, and the resulting matrix inverse calculation would be computationally impractical or impossible.

One solution to the problem would be to consider each satellite and the corresponding users on the ground in communication with that respective satellite in isolation. While this is a simplified approach, it is not optimal for the following reason. Assume a particular satellite of interest (S1) that communicates with a set of users (U1) on the ground. There are also other satellites (Sn) and other users of those satellites (Un). If we consider (S1) and the users (U1) in isolation, the beamforming computation will ignore interference from the other satellites (Sn) for the set of users (U1). It also ignores the interference from satellite (S1) with the users (Un) of the other satellites (Sn). Ignoring the interference results in very low system performance and is the opposite of trying to account for all satellites and users, as above, in a computationally unworkable approach.

To address these technical problems, a technical solution is provided herein that utilizes an effective and improved beamforming approach between the above-described extremes. Specifically, an extended MMSE beamforming approach can make the problem tractable, similar to the approach above considering satellites and user groups in isolation, while also taking into account interference between the different satellites. An extended MMSE beamforming approach uses a matrix $H_1$, which includes the responses from all the antenna elements of satellite (S1) to each of that satellite's users (U1). The matrix is then augmented by adding all the responses from all the elements of satellite (S1) to each of the other users of other satellites with which the beams from satellite (S1) might cause significant interference. In one aspect, the matrix $H_1$ can be determined by adding consideration of other users based on distance. For example, cells served by other satellites, meaning that the effective communication to and from those cells is provided by another satellite, may be considered as potential sources of interference if they fall within a threshold distance (on the earth's surface) away from the cell for which the system is optimizing communication. Cells within that threshold distance will be included in the matrix, as described herein, to provide a more accurate beamforming and improved communication with the target cell.

For example, consider a location-based beamforming design. In such a design, the propagation paths are primarily Line-of-Sight (LOS), and the values of H can be estimated based on the geometry of the satellite antenna and locations of the ground stations on the earth's surface. When considering satellite (S1), besides the users (U1) of satellite (S1), an extended beamforming approach will also consider the additional users (Un) of other satellites (Sn) which are close enough to users in the set (U1) that satellite (S1) may cause significant interference to them, forming a larger set of users $U_1^* = U_1 \cup U_1'$. The new larger set of users $U_1^*$ is now used to compute the beamforming for satellite (S1), resulting in the beam weights $W_1^*$. Finally, for the actual beamforming matrix for satellite (S1), the technique discards unused rows/columns of Wit which correspond to the users in the set $U_1'$ which are served by other satellites.

The effect is that when computing the beam weights $W_1$, not only are the users served by satellite (S1) considered, but also the interference to users of other satellites which are close enough to the users served by satellite (S1) to cause interference to them are considered. The result is that the interference into those other users will be minimized (to the extent permitted by the optimization procedure). At the same time, the optimization problem complexity is manageable, unlike the solution discussed above.

Figure 4:
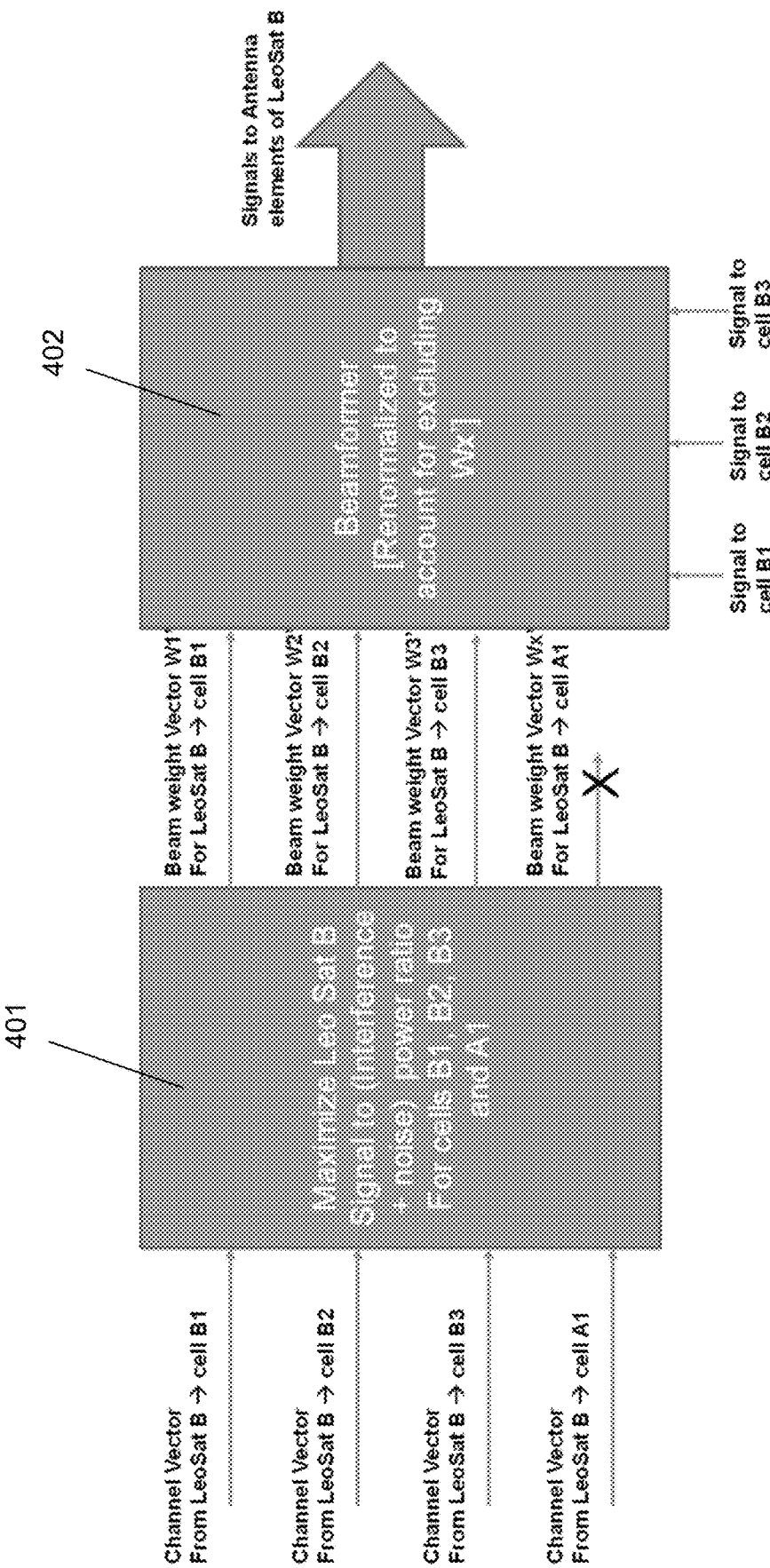
FIG. 4 illustrates another example beamforming system for satellite communication according to principles described herein.

FIG. 4 illustrates an example beamforming system according to these principles with reference to FIGS. 2 and 3. As shown in FIG. 4, the processor 401 now receives the channel vectors for the communication between satellite B and cells B1-B3 and a channel vector for the communication between satellite B and cell A1, which satellite B is not serving. Thus, the channel vector between satellite B and cell A1 represents potential interference and is included in the optimization of the beamforming.

The processor 401 again generates beam weight vectors $W1'-W_X'$ based on these channel vectors so as to maximize the ratio of the power of the signal over the power of the interference and noise. Significantly, the beam weight vectors are computed jointly to maximize the SINR or equivalently to minimize the MSE at cells B1-B3 and A1. In other words, the calculation now takes into account the channel vector to cell A1. As before, the processor outputs beam weight vectors for each cell. However, because the satellite is not actually intended to communicate with cell A1, the beam weight vector for cell A1 is discarded, as shown in FIG. 4, and is not used in beamforming the signals to the cells B1-B3.

The remaining beam weight vectors are input to the beamformer 402. Again, the beamformer 402 also receives the signals to be transmitted to teach cell B1-B3. The beamformer 402 is renormalized to account for excluding the beam weight vector for cell A1. The beamformer 402 then outputs driver signals to the antenna elements of satellite B, as described above. The result is an improvement in mitigating the interference between satellites A and B.

In a simulation of a LEO satellite system, the following measured results were made comparing beamforming with and without the extended beamforming approach described above. Table 1 shows a comparison of the interference powers measured with and without the extended beamforming. Here the units of power are not calibrated in particular units but give relative strengths. Interference power was measured both between beams coming from the same satellite and beams coming from different satellites. In both cases, interference power was measured both at beam centers and at beam corners. As shown, there is a substantial reduction in interference power using the extended beamforming technique.

TABLE 1

| | Comparison of Interference Power | | | |
| --- | --- | --- | --- | --- |
| | interf. pwr. same sat center | interf. pwr. same sat corner | interf. pwr. other sat center | interf. pwr. other sat corner |
| without extend | 4.36 | 3.97 | 4.82 | 5.41 |
| with extend | 3.88 | 3.48 | 3.14 | 3.80 |

Figure 5:
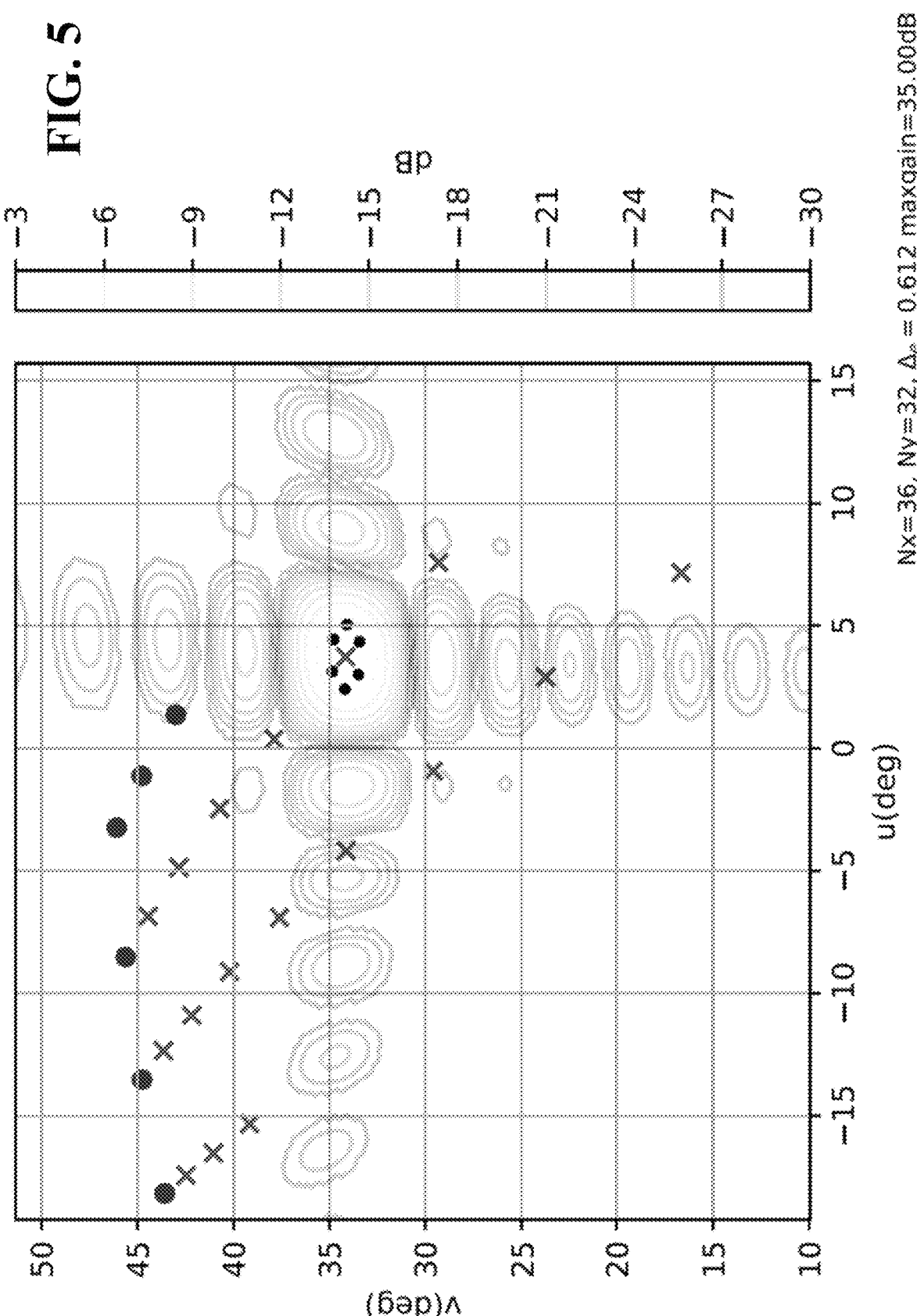
FIG. 5 illustrates an example of the results of beamforming with a system as shown in FIG. 4.

FIG. 5 illustrates the effect of an example of extended MMSE beamforming, as described herein. The figure shows the signal contours on the earth's surface. The X's mark the locations of cell centers being served by a single satellite. The larger dots are the locations of cell centers being served by different satellites, but which are close enough to the cells served by the first satellite that signal interference may be an issue.

In the figure, the beam formed and aimed at the cell centered on the X that is surrounded by the smaller black dots is considered. Of course, beams are also formed to serve the cells centered on the other X's simultaneously. However, the illustration concentrates on the beam formed serving the particular X surrounded by the smaller black dots. Thus, the figure illustrates the improved signal focusing on the target cell.

Specifically, the beams are formed using an MMSE algorithm, which will attempt to balance between minimizing interference and maximizing gain. Because the cells indicated with the larger dots are included in the set of points considered by the MMSE algorithm, the responses at those points are minimized to the extent possible. If the MMSE algorithm had not been extended to include those extra points the interference into those locations would not have been controlled.

FIG. 6 illustrates a flowchart for an example method of beamforming according to the principles described herein. In this example, the beamforming matrix developed is for the multi-element steerable antenna of a particular satellite. As shown in FIG. 6, the method begins with formulating a matrix that includes responses from all the elements of the satellite antenna to each of the intended users of that satellite 601.

The matrix is then augmented by adding all the responses from all the elements of the satellite's antenna to each of any other users of other satellites that are in a location with which the current satellite might interfere 602. The extension of the responses being considered in the matrix provides the improvement in the beamforming to the intended users.

Next, the method uses the augmented matrix to compute the beam weight vectors for the beamformer of the satellite 603. Computing the beam weight vectors can be performed by a processor, such as that illustrated and described in FIG. 4. As in FIG. 4, for the actual beamforming matrix, the method discards unused rows or columns that correspond to the users that are served by other satellites 604. The technique is not to beamform for those users, but merely to take their effect into account.

After factoring in the users served by other satellites, the beamforming matrix is completed. The beamforming matrix is then applied to generating the driving signals for the antenna elements of the satellite 605. Because the responses of other users of other satellites have been accounted for in the beamforming, the resulting communication has improved efficiency.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

Unless otherwise stated, all measurements, values, ratings, positions, magnitudes, sizes, and other specifications that are set forth in this specification are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method of beamforming with an antenna for satellite communications, the antenna comprising an array of radiating elements, the method comprising:

formulating a matrix based on responses from all elements of the antenna to each of a number of users of a first satellite;

augmenting the matrix by adding responses from the elements of the antenna to other users served by a different satellite;

from the augmented matrix, generating beam weight vectors for a beamforming matrix; and with the beamforming matrix, beamforming a beam from the antenna.

2. The method of claim 1, wherein augmenting the matrix comprises adding to the matrix a response from the elements of the antennae of a set of other users served by a different satellite who are in proximity, within a threshold, to users of the first satellite such that interference that degrades communication can occur.

3. The method of claim 1, wherein generating the beamforming matrix further comprises discarding rows or columns from the augmented matrix that correspond to the other users served by the different satellite.

4. The method of claim 3, further comprising renormalizing the beamforming to account for discarding the rows or columns from the augmented matrix that correspond to the other users served by the different satellite.

5. The method of claim 1, wherein generating the beamforming matrix comprises using Minimum Mean Square Error (MMSE).

6. The method of claim 1, wherein the antenna is an antenna on the first satellite.

7. The method of claim 1, wherein the antenna is an antenna of a user terminal for communication with the first satellite.

8. The method of claim 1, wherein the first satellite and the different satellite are Low Earth Orbit satellites.

9. The method of claim 1, wherein the responses from all elements of the antenna to one of the number of users of a first satellite is given as a channel vector.

10. A beamforming system for an antenna for satellite communications, the antenna comprising an array of radiating elements, the system comprising:

a processor programmed to receive channel vectors representing responses from all elements of the antenna to each of a number of users of a first satellite and augment a matrix formulated from the channel vectors with a number of additional channel vectors representing responses from elements of antennae of other users served by a different satellite, the processor to generate a beam weight vector for each channel vector by jointly maximizing a signal to noise and interference ratio (SINR); and a beamformer to generate a beamforming matrix from the beam weight vectors and use the beamforming matrix to drive the elements of the antenna to beamform a beam from the antenna.

11. The system of claim 10, wherein the processor is programmed to augment the matrix by adding channel vectors representing responses from the elements of the antennae of the set of other users served by a different satellite who are in proximity, within a pre-determined threshold, to users of the first satellite such that interference that degrades communication can occur.

12. The system of claim 10, wherein the beamformer, when generating the beamforming matrix, is programmed to discard rows or columns from the augmented matrix that correspond to the other users served by a different satellite.

13. The system of claim 12, wherein the beamformer is configured to renormalize to account for discarding the rows or columns from the augmented matrix that correspond to the other users served by a different satellite.

14. The system of claim 10, wherein generating the beamforming matrix comprises using Minimum Mean Square Error (MMSE).

15. The system of claim 10, wherein the antenna is an antenna on the first satellite.

16. The system of claim 10, wherein the antenna is an antenna of a user terminal for communication with the first satellite.

17. The system of claim 10, wherein the first satellite and the different satellite are Low Earth Orbit satellites.

18. The system of claim 10, wherein the responses from all elements of the antenna to one of the number of users of a first satellite is given as a channel vector.

19. A method of beamforming with an antenna of a first satellite, the antenna comprising an array of radiating elements, the method comprising:

beamforming a beam of the antenna by taking into account responses of the elements to users of the first satellite; and further adjusting the beamforming by taking into account responses of the elements to a set of users of a second satellite, where the users of the second satellite are in terrestrial proximity to the users of the first satellite such that interference that degrades communications can occur.

20. The method of claim 19, further comprising:

formulating a matrix based on the responses from all elements of the antenna to each of the users of a first satellite;

augmenting the matrix by adding responses from the elements of the antenna to the set of users of the second satellite;

discarding rows or columns from the augmented matrix that correspond to the set of users of the second satellite;

from the augmented matrix, generating a beamforming matrix; and with the beamforming matrix, beamforming a beam from the antenna.

* * * * *